United States Patent
Balasubramanian et al.

(10) Patent No.: US 10,667,099 B2
(45) Date of Patent: May 26, 2020

(54) WAIC INTERFACE DEVICE

(71) Applicant: Goodrich Corporation, Charlotte, NC (US)

(72) Inventors: Rameshkumar Balasubramanian, Bangalore (IN); Pullaiah Dussa, Kudlu (IN); Michael A. Lynch, Shelburne, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/258,793

(22) Filed: Jan. 28, 2019

(65) Prior Publication Data
US 2020/0053529 A1    Feb. 13, 2020

(51) Int. Cl.
*H04W 4/42*    (2018.01)
*H04W 36/00*    (2009.01)
(Continued)

(52) U.S. Cl.
CPC ............ *H04W 4/42* (2018.02); *H01Q 1/246* (2013.01); *H01Q 1/526* (2013.01); *H01Q 5/30* (2015.01);
(Continued)

(58) Field of Classification Search
CPC ....................................................... H04W 4/42
See application file for complete search history.

(56) References Cited

U.S. PATENT DOCUMENTS 8,613,385 B1 * 12/2013 Hulet ................. B64D 11/0015
                                                              235/375
9,178,567 B2    11/2015 Klein et al.
(Continued)

FOREIGN PATENT DOCUMENTS

EP        2819317 A2    12/2014
WO    2015127203 A1     8/2015

OTHER PUBLICATIONS

Extended European Search Report dated Dec. 6, 2019, received for corresponding European Application No. 19190594.2.
(Continued)

*Primary Examiner* — Wen W Huang
(74) *Attorney, Agent, or Firm* — Kinney & Lange, P.A.

(57) ABSTRACT

A Wireless Avionics Intra-Communications (WAIC) interface device provides communication between a portable electronic device and a WAIC controller. The WAIC interface device includes a housing, a wireless antenna, wireless access point electronics, and an interface controller. The housing is configured to be mounted to an interior surface of an aircraft and to receive and engage the portable electronic device. The wireless access point electronics are connected via a communication port to a first wired connection to communicate with the WAIC controller. The interface controller authenticates the portable electronic device. A WAIC coordinator is connected to the WAIC controller via a second wired connection, and is configured to communicate wirelessly over a WAIC frequency range between 4.2 gigahertz (GHz) and 4.4 GHz. An end node includes a transceiver configured to communicate wirelessly with the WAIC coordinator over the WAIC frequency range between 4.2 gigahertz (GHz) and 4.4 GHz.

19 Claims, 5 Drawing Sheets

(51) Int. Cl.
*H04W 4/80* (2018.01)
*H01Q 1/24* (2006.01)
*H01Q 5/30* (2015.01)
*H01Q 1/52* (2006.01)
*H04W 12/06* (2009.01)
*H04B 5/00* (2006.01)
*H04W 88/10* (2009.01)
*H04W 84/12* (2009.01)

(52) U.S. Cl.
CPC ............ *H04B 5/0037* (2013.01); *H04W 4/80* (2018.02); *H04W 12/06* (2013.01); *H04W 36/0022* (2013.01); *H04W 36/0038* (2013.01); *H04W 84/12* (2013.01); *H04W 88/10* (2013.01)

(56) References Cited

U.S. PATENT DOCUMENTS

| | | |
|---|---|---|
| 9,334,063 B2 | 5/2016 | Baumgarten et al. |
| 9,698,467 B2 | 7/2017 | Mitchell |
| 10,470,012 B1* | 11/2019 | Balasubramanian ........................ H04W 12/06 |
| 2011/0009057 A1* | 1/2011 | Saunamaki ............. H02J 7/025 455/41.1 |
| 2012/0243463 A1* | 9/2012 | Aguirre ................. H04W 84/14 370/316 |
| 2016/0095045 A1* | 3/2016 | Salomon ......... H04W 12/00503 455/411 |
| 2019/0031366 A1* | 1/2019 | Lauer ................ B64D 11/0015 |

OTHER PUBLICATIONS

Aysegul Aglargoz, Holger Spangenberg, Safety and Relizbility Analysis of Wireless Data Communication concepts for Flight Control Systems, Oct. 2014.

Muhammad Suryanegara, Achmad Nashirudin, Naufan Raharya, Muhamad Asvial, The compatibility Model between the Wireless Avionics Intra-Communication (WAIC) and Fixed Services at 22-23 GHz, 2015.

Ramiro Samano-Robles, Eduardo Tovar, Joao Cintra, and Andre Rocha, Wireless Avionics Intra-Communication: Current Trends and Design Issues, 2016.

\* cited by examiner

WAIC INTERFACE DEVICE

CROSS-REFERENCE TO RELATED APPLICATION(S)

This application claims the benefit of India Provisional Application No. 201841029927 filed Aug. 9, 2018 for "WAIC INTERFACE DEVICE" by Rameshkumar Balasubramanian, Pullaiah Dussa, and Michael A. Lynch.

BACKGROUND

The present disclosure relates generally to wireless communications, and in particular to a Wireless Avionics Intra-Communications (WAIC) interface device.

Modern aircraft typically transmit data between sensors and systems positioned about the aircraft using wired aircraft data buses, such as serial or other wired data buses. Using the data buses, data is routed between producing systems and consuming systems for operational monitoring and control of the aircraft. Certain data is routed to flight display systems, such as primary flight displays (PFDs) or an electronic flight instrument system (EFIS) located in the aircraft cockpit.

Recently, portable electronic devices such as tablet computers have been used in the cockpit as ancillary interfaces which display certain aircraft operational data and receive user input for, e.g., flight planning, flight optimization, takeoff and landing checklists, prognostic and diagnostic health operations, or other aircraft flight planning and control operations. The portable electronic devices provide supplemental interfaces for display and user input without requiring additional display and/or input devices mounted in the cockpit, thereby reducing space, weight, and cost associated with the additional interfaces.

The portable electronic devices often communicate wirelessly with one or more aircraft systems and devices to receive information for display and to transmit user input information for operational control of the aircraft. Such wireless communications, though often encrypted or otherwise protected, are typically transmitted over frequency ranges that are accessible to commercially available electronic devices, such as the 900 megahertz (MHz), 2.4 GHz, 3.6 GHz, 5 GHz, and/or 60 GHz frequency bands. Indeed, the portable electronic devices used as ancillary pilot and/or crew interfaces are also often commercially available off-the-shelf (COTS) devices which communicate wirelessly in one or more of the standard frequency bands.

More recently, to decrease the space, weight, and cost associated with wired aircraft data buses, wireless communications between aircraft systems and/or sensors has been considered. To increase available bandwidth and to enhance security, the Wireless Avionics Intra-Communications (WAIC) standard has been proposed. The WAIC standard specifies wireless communications in a frequency range between 4.2 gigahertz (GHz) and 4.4 GHz. In addition, the WAIC standard specifies that WAIC communications are limited to wireless communications only between aircraft systems and/or components.

SUMMARY

In one example, a Wireless Avionics Intra-Communications (WAIC) interface device that provides communication between a portable electronic device and a WAIC controller includes a housing, a wireless antenna, wireless access point electronics, and an interface controller. The housing is configured to be mounted to an interior surface of an aircraft and to receive and engage the portable electronic device. The wireless antenna is located within the housing. The wireless access point electronics is located within the housing and is connected to the wireless antenna to communicate wirelessly with the portable electronic device via the wireless antenna. The wireless access point electronics are further connected via a communication port to a wired connection to communicate with the WAIC controller. The interface controller is located within the housing and is connected to the wireless access point electronics. The interface controller authenticates the portable electronic device, so that the wireless access point electronics can establish wireless communications between the WAIC controller and the portable electronic device via the wireless antenna, the wireless access point electronics, and the wired connection.

In another example, a Wireless Avionics Intra-Communications (WAIC) interface system for use with a portable electronic device includes a WAIC interface device, a WAIC controller, a WAIC coordinator, and an end node. The WAIC interface device receives, engages, and communicates wirelessly with the portable electronic device. The WAIC controller is connected to the WAIC interface device via a first wired connection for communication with the portable electronic device via the WAIC interface device. The WAIC coordinator is connected to the WAIC controller via a second wired connection for communication with the WAIC controller. The WAIC coordinator is configured to communicate wirelessly over a WAIC frequency range between 4.2 gigahertz (GHz) and 4.4 GHz. The end node includes a transceiver configured to communicate wirelessly with the WAIC coordinator over the WAIC frequency range between 4.2 gigahertz (GHz) and 4.4 GHz.

In another example, a method includes establishing, using a wireless antenna and wireless access point electronics of a WAIC interface device, a first wireless communications session with a portable electronic device for wireless communications between the WAIC interface device and the portable electronic device. The method further includes communicating, using a first wired connection from the WAIC interface device, between the WAIC interface device and a WAIC controller. The method further includes communicating, using a second wired connection from the WAIC controller, between the WAIC controller and a WAIC coordinator. The method further includes establishing a second wireless communications session from the WAIC coordinator, for wireless communications between the WAIC coordinator and an end node transceiver and system/sensor using WAIC standard in frequency range between 4.2 gigahertz (GHz) and 4.4 GHz. The method further includes disconnecting, upon disengagement of the portable electronic device from the WAIC interface device, the WAIC interface device and disengaged portable electronic device from communicating with the WAIC coordinator.

DETAILED DESCRIPTION

Figure 1:
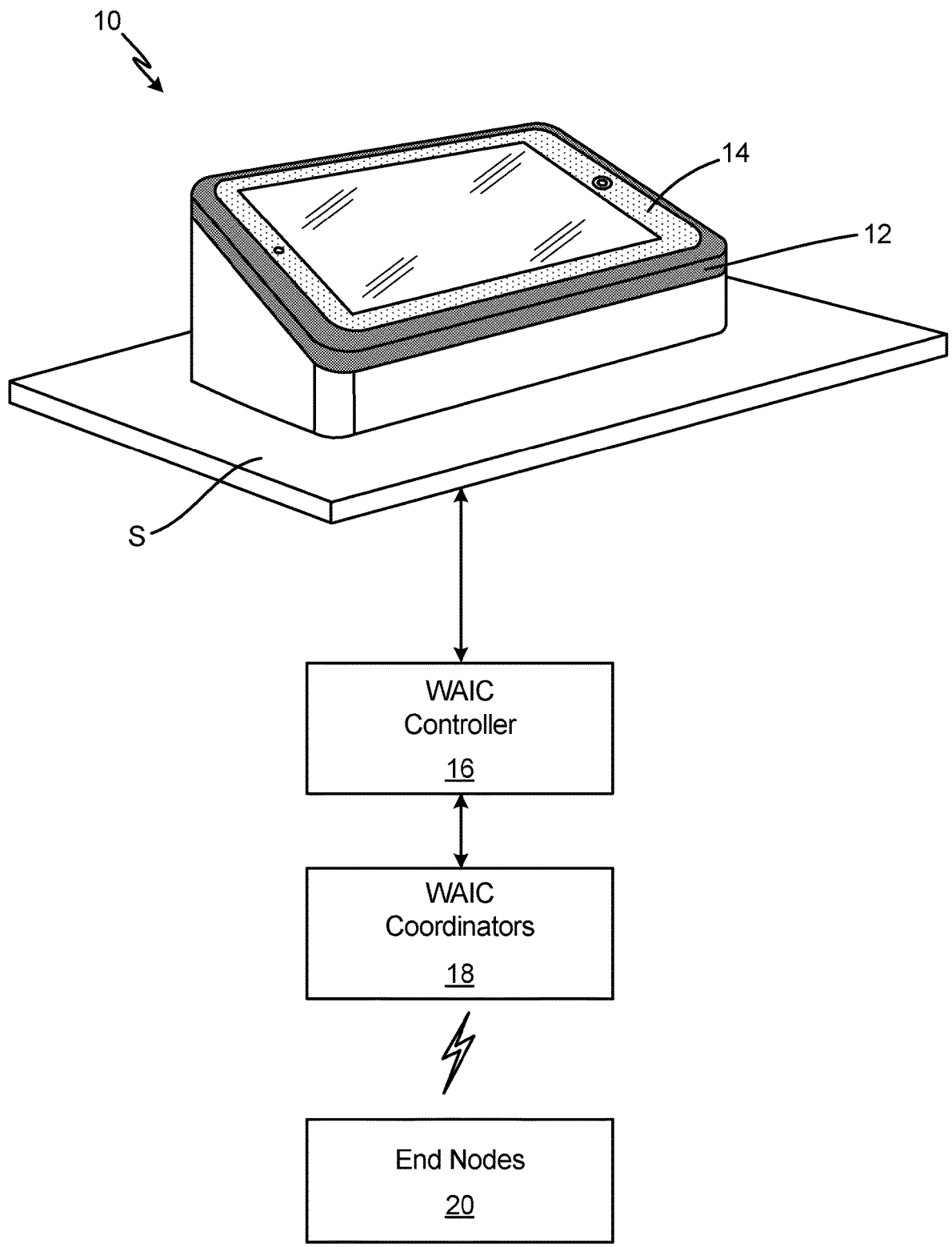
FIG. 1 is a schematic block diagram of an example system including a Wireless Avionics Intra-Communications (WAIC) interface device engaged with a portable electronic device for communicating with one or more aircraft systems.

As described herein, a WAIC interface device (WIDE) includes a housing configured to be mounted to an interior surface of an aircraft and to receive and engage a portable electronic device. Located within the housing are a wireless antenna and wireless access point (WAP) electronics configured to establish a wireless communications session with the portable electronic device, such as a tablet computer, a laptop computer, a mobile phone (e.g., a smartphone), or other portable electronic device. The wireless communications session between the WAIC interface device and the portable electronic device can be configured for sending and receiving wireless data via, e.g., the Institute of Electrical and Electronics Engineers (IEEE) 802.11 protocol, the IEEE 802.15.1 protocol, or other standard or proprietary communications protocols in, for example, the 900 megahertz (MHz), 2.4 GHz, 3.6 GHz, 5 GHz, and/or 60 GHz frequency bands. Accordingly, wireless communications between the WAIC interface device and the portable electronic device can be accomplished via standard or proprietary communications protocols in frequency bands typically supported by commercially available off-the-shelf (COTS) devices.

The WAIC interface device further includes a first wired connection to a WAIC controller to communicate with the WAIC controller. The WAIC controller includes a second wired connection to a WAIC coordinator to communicate with the WAIC coordinator. The WAIC coordinator is configured to communicate wirelessly with one or more aircraft end node transceivers and systems/sensors using the WAIC standard in a frequency range between 4.2 GHz and 4.4 GHz.

The WAIC interface device communicates wirelessly with the portable electronic device via the IEEE 802.11, the IEEE 802.15.1, or other standard or proprietary communications protocols supported by the portable electronic device (e.g., a COTS device). The WAIC interface device routes data between the portable electronic device and the WAIC controller via the first wired connection. The WAIC controller communicates, via the second wired connection, with the WAIC coordinators to route the data there between. The WAIC coordinators communicate wirelessly via WAIC communications in the frequency range between 4.2 GHz and 4.4 GHz with one or more aircraft end node transceivers and systems/sensors. As such, the WAIC interface device enables communication between the portable electronic device and aircraft systems/sensors in the WAIC frequency range between 4.2 GHz and 4.4 GHz. Moreover, to enhance security and to adhere to the WAIC standard specifying that WAIC communications are limited to only those wireless communications between aircraft systems and sensors of the same aircraft, the WAIC interface device described herein is physically installed within the interior of the aircraft and configured to communicate with only those portable electronic devices that are physically adjacent the WAIC interface device (e.g., physically docked with the WAIC interface device).

FIG. 1 is a schematic block diagram of system 10 including WAIC interface device 12, portable electronic device 14, WAIC controller 16, one or more WAIC coordinators 18, and one or more aircraft end node transceivers and systems/sensors (end nodes) 20. In the illustrated embodiment, portable electronic device 14 is engaged with WAIC interface device 12, which is affixed to aircraft interior cabin surface S.

WAIC controller 16, one or more WAIC coordinators 18, and end nodes 20, as illustrated, can be positioned in an avionics bay or other areas of an aircraft within which aircraft sensors or other electronics are located. End nodes 20 can be any aircraft sensors and/or corresponding systems used for monitoring or operational control of the aircraft, such as pressure sensors, temperature sensors, speed sensors, engine systems, flight control systems, flight management computers, or other aircraft end node transceiver and system/sensor.

WAIC controller 16 is an electronic device having one or more processors and computer-readable memory configured to route data between WAIC interface device 12 and WAIC coordinators 18 for communication between end nodes 20 and WAIC interface device 12 over the WAIC frequency range between 4.2 GHz and 4.4 GHz. WAIC controller 16 is electrically and/or communicatively coupled, via WAIC coordinators 18, with end nodes 20 to send and receive aircraft operational and/or sensor data via wired or wireless communications, or both. For instance, in some examples, WAIC controller 16 is electrically coupled, via WAIC coordinators 18, with end nodes 20 via a serial and/or digital communications data bus, such as a communications data bus that communicates via the Aeronautical Radio, Incorporated (ARINC) 429 or other communications protocol. In certain examples, WAIC controller 16 is communicatively coupled, via WAIC coordinators 18, to communicate with end nodes 20 via wireless communications over the WAIC frequency range between 4.2 gigahertz (GHz) and 4.4 GHz.

In the example of FIG. 1, WAIC interface device 12 is configured to make a first wireless connection to portable electronic device 14. WAIC interface device 12 further includes a first wired connection to WAIC controller 16. WAIC controller 16 is connected, via a second wired connection, to WAIC coordinator 18. WAIC coordinator 18 is wirelessly connected to send and receive WAIC communications (i.e., wireless communications in a frequency range between 4.2 GHz and 4.4 GHz) with end nodes 20.

Portable electronic device 14 can be a tablet computer, mobile phone (e.g., a smartphone), laptop computer, or other portable electronic device capable of displaying information to a user and, in some examples, receiving user input in the form of button actuations, user gestures received at a touch sensitive display, or other user input. For instance, portable electronic device 14 can be a tablet computer having processors and computer-readable memory configured to execute a software application that interfaces with WAIC interface device 12 to display aircraft operational data and receive user inputs for, e.g., flight planning, flight optimization, or other aircraft interface operations.

Portable electronic device 14, in some examples, is a commercially available off-the-shelf (COTS), military commercial off-the-shelf (Mil-COTS), or other portable electronic device configured to communicate via wired connection, such as via a Universal Serial Bus (USB) or other wired connection and/or wirelessly via, e.g., the IEEE 802.11 or IEEE 802.15.1 specifications in the 900 megahertz (MHz), 2.4 GHz, 3.6 GHz, 5 GHz, and/or 60 GHz frequency bands. That is, as in the example of FIG. 1, portable electronic device 14 can be configured to communicate wirelessly via the IEEE 802.11 or the IEEE 802.15.1 specifications (e.g., with WAIC interface device 12), but may lack the electronics or other circuitry to communicate wirelessly over the WAIC frequency range between 4.2 GHz and 4.4 GHz.

WAIC interface device 12 receives and engages portable electronic device 14. WAIC interface device 12 can include a wireless antenna and wireless access point (WAP) electronics to enable WAIC interface device 12 to communicate wirelessly with portable electronic device 14. Such wireless communications can include, e.g., IEEE 802.11, IEEE 802.15.1, or other standard wireless communications protocols supported by portable electronic device 14 (e.g., a COTS device). To ensure compliance with WAIC standards specifying that WAIC communications are limited to only those aircraft sensors/systems located on the same aircraft, WAIC interface device 12 can be configured to disconnect the wireless communications session (e.g., via the IEEE 802.11 or IEEE 802.15.1 protocol) with portable electronic device 14 when portable electronic device 14 is not docked at or otherwise attached or physically engaged with WAIC interface device 12.

Accordingly, WAIC interface device 12 enables communications between portable electronic device 14 (docked at or otherwise engaged with WAIC interface device 12) and end nodes 20 via WAIC communications in the WAIC frequency range between 4.2 GHz and 4.4 GHz. Communications between portable electronic device 14 and WAIC interface device 12 are accomplished using the IEEE 802.11, the IEEE 802.15.1, or other standard or proprietary wireless frequency range supported by portable electronic device 14 (e.g., a COTS device). WAIC interface device 12 communicates via wired connection with WAIC controller 16 which routes data to and from one or more WAIC coordinators 18 for wireless communication with end nodes 20.

Figure 2:
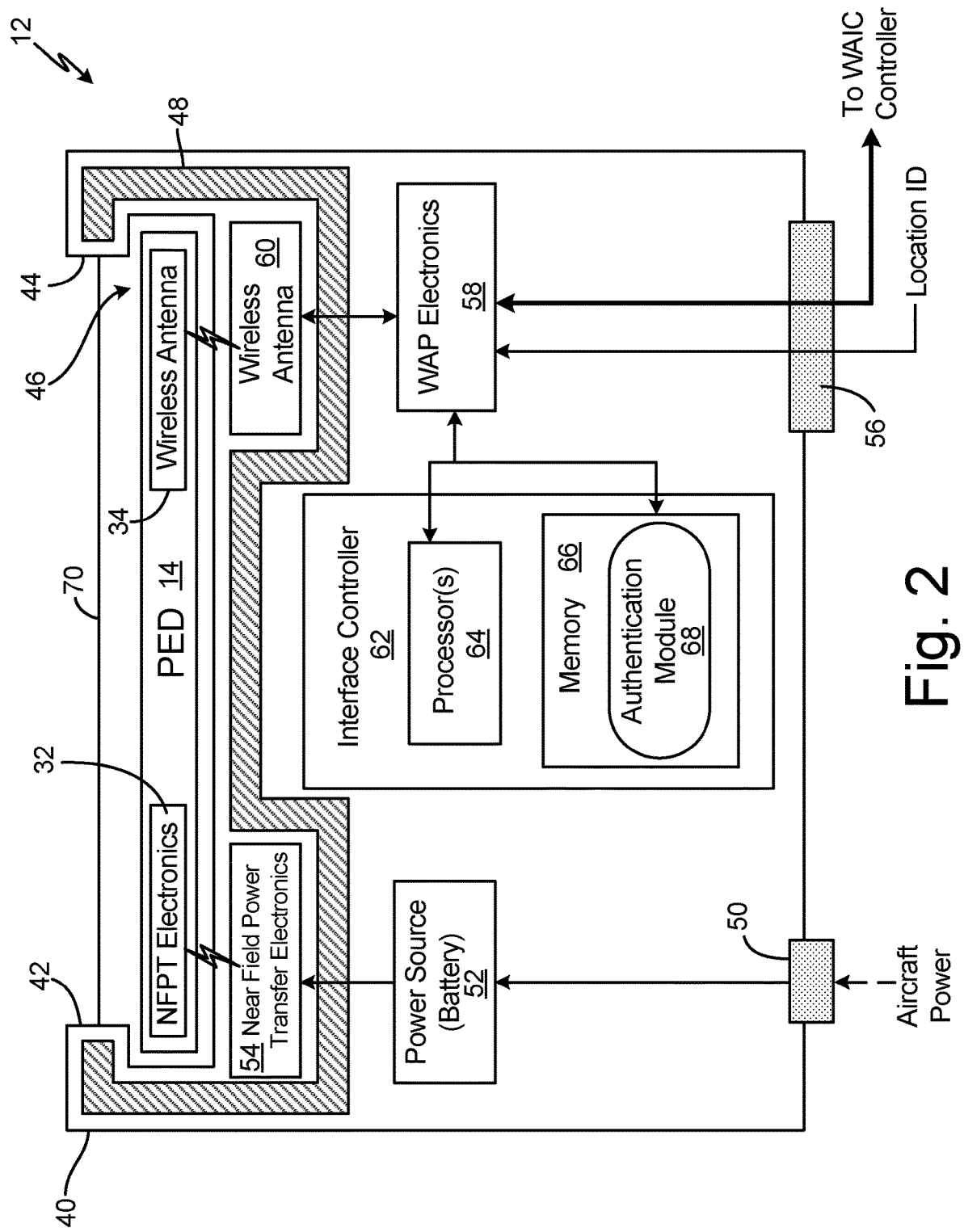
FIG. 2 is a schematic diagram illustrating further details of the WAIC interface device engaged with the portable electronic device.

FIG. 2 is a schematic diagram illustrating further details of WAIC interface device 12 engaged with portable electronic device 14. As illustrated in FIG. 2, portable electronic device 14 (a tablet computer in this example) includes wireless antenna 34 and near field power transfer electronics (NFPT) 32.

WAIC interface device 12 includes housing 40 (with engagement members 42 and 44 that define retaining region or slot 46), shield 48, electrical power port 50, power source 52 (a battery in this example), near field power transfer electronics 54, communication port 56, wireless access point (WAP) electronics 58, wireless antenna 60, and interface controller 62 (including one or more processors 64, and computer-readable memory 66 with authentication module 68). In some examples, such as the example of FIG. 2, WAIC interface device 12 also includes display cover 70 that extends between engagement members 42 and 44. Shield 48 is located with housing 40 and is formed of a conductive material to shield wireless antenna 60 and near field power transfer electronics 54 from electromagnetic interference, as is further described below.

Wireless antennas 34 and 60 can be configured to communicate wirelessly via, e.g., the IEEE 802.11 or IEEE 802.15.1 specifications in, for example, the 900 megahertz (MHz), 2.4 GHz, 3.6 GHz, 5 GHz, and/or 60 GHz frequency bands. Accordingly, when wirelessly connected, communications of data between portable electronic device 14 and WAIC interface device 12 is achieved via a wireless communications session established by WAIC interface device 12 between WAP electronics 58 and portable electronic device 14. WAP electronics 58 communicatively connects wireless antenna 60 with interface controller 62 for wireless communications with portable electronic device 14 via the IEEE 802.11, the IEEE 802.15.1, or other standard or proprietary wireless protocol.

Processor 64, in some examples, is configured to implement functionality and/or process instructions for execution within WAIC interface device 12. For instance, processor 64 can be capable of processing instructions stored in computer-readable memory 66, such as instructions associated with authentication module 68. Examples of processor 64 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 66 can be configured to store information within WAIC interface device 12 during operation. Computer-readable memory 66, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory 66 can include volatile and/or non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable memories (EEPROM).

Computer-readable memory 66 can be used to store program instructions for execution by processor 64. For instance, as illustrated in FIG. 2, computer-readable memory 66 can store computer-readable instructions that, when executed by processor 64, cause WAIC interface device 12 to operate in accordance with techniques attributed herein to authentication module 68.

Electrical power port 50 can be a USB or other standard or proprietary interface connector configured for electrical power connection with an external power source. In some examples, WAIC interface device 12 receives electrical power for operation of components of WAIC interface device 12 via electrical power port 50. In certain examples, power source 52 (a battery in this example) can receive electrical power via electrical power port 50 to charge the battery. In some examples, near field power transfer electronics 54 can transfer power from power source 52 to an electronic device (e.g., to NFPT electronics 32 of portable electronic device 14). In other examples, WAIC interface device 12 receives electrical power for operation of components of WAIC interface device 12 from an electronic device (e.g., from NFPT electronics 32 of portable electronic device 14) via near field power transfer electronics 54. In certain examples, power source 52 can receive electrical power from an electronic device (e.g., from NFPT electronics 32 of portable electronic device 14) via near field power transfer electronics 54 to charge the battery.

Communication port 56 can be a USB or other standard or proprietary interface connector configured for wired communication with another device. For instance, in some examples, WAIC interface device 12 is electrically and/or communicatively connected with WAIC controller 16 via a serial and/or digital communications data bus, such as a communications data bus that communicates via the Aeronautical Radio, Incorporated (ARINC) 429 or other communications protocol.

As illustrated in FIG. 2, WAIC interface device 12 includes housing 40 that encloses components of WAIC interface device 12. That is, as illustrated in FIG. 2, each of WAP electronics 58, wireless antenna 60, electrical power port 50, power source 52, near field power transfer electronics 54, interface controller 62, shield 48, and communication port 56 is positioned within housing 40.

Housing 40 includes engagement members 42 and 44 that extend from a periphery of housing 40 (e.g., from opposing sides of the periphery of housing 40) toward a central region of WAIC interface device 12 to define retaining region (or slot) 46 configured to engage with and secure portable electronic device 14 within WAIC interface device 12 during operation thereof. For instance, portable electronic device 14 can be inserted into retaining region (or slot) 46 such that engagement members 42 and 44 extend beyond the edges of portable electronic device 14 by a distance sufficient to retain portable electronic device 14 within housing 40. In some examples, such as the example of FIG. 2, WAIC interface device 12 includes display cover 70 that extends between engagement members 42 and 44 to protect a display of portable electronic device 14 and to further retain portable electronic device 14 within WAIC interface device 12. Display cover 70 can be formed of any transparent or semi-transparent material (e.g., plastic, glass, or other transparent or semi-transparent material) to enable viewing of content displayed by portable electronic device 14 and/or to enable user interaction via, e.g., user gesture input (such as when the display of portable electronic device 14 is a touch-sensitive display).

Shield 48 is an electrical conductor that is formed of an electrically-conductive material to shield wireless antenna 60 and near field power transfer electronics 54 from electromagnetic interference. Shield 48 is positioned within WAIC interface device 12 such that near field power transfer electronics 54 and wireless antenna 60 are disposed on a first side of Shield 48 within housing 40 adjacent retaining region (or slot) 46 (and portable electronic device 14 when inserted into retaining region (or slot) 46). Other components of WAIC interface device 12 (i.e., WAP electronics 58, electrical power port 50, power source 52, interface controller 62, and communication port 56) are disposed on a second side of shield 48, opposite the first side.

In operation, when engaged with portable electronic device 14, interface controller 62 receives authentication information corresponding to portable electronic device 14 via wireless antenna 60 and WAP electronics 58. Authentication information of portable electronic device 14 can include a serial number or other unique identifier of the portable electronic device. Computer-readable memory 66 stores a list, table, or other association of unique identifiers of portable electronic devices that are authorized for use with WAIC interface device 12. Using authentication module 68, processor 64 compares the unique identifier of portable electronic 14 device with the list or other association of authorized portable electronic devices to determine whether portable electronic device 14 is authenticated. In response to determining that portable electronic device 14 is authenticated (e.g., included in the list or other association), interface controller 62 establishes wireless communications between WAIC interface device 12, via WAP electronics 58, and portable electronic device 14.

In response to determining that the portable electronic device (e.g., portable electronic device 14) is authenticated, interface controller 62 also establishes communications between WAIC interface device 12 and WAIC controller 16 (FIG. 1) via the wired connection for communication with WAIC coordinators 18 (FIG. 1), and to end nodes 20 (FIG. 1) via wireless communications in the WAIC frequency range of 4.2 GHz to 4.4 GHz. As such, WAIC communications is established between portable electronic device 14 and end nodes 20 (i.e., aircraft systems/sensors).

In response to determining that the portable electronic device is not authenticated (e.g., not included in the list or other association), interface controller 62 refrains from establishing the communications session (e.g., via the wired connection) between WAIC interface device 12 and WAIC controller 16, thereby preventing communication of portable electronic device 14 with end nodes 20 via the WAIC communications. Accordingly, interface controller 62 can control WAIC communications to limit use of WAIC interface device 12 to only those portable electronic devices that are authorized, thereby enhancing security of operation.

Figure 3:
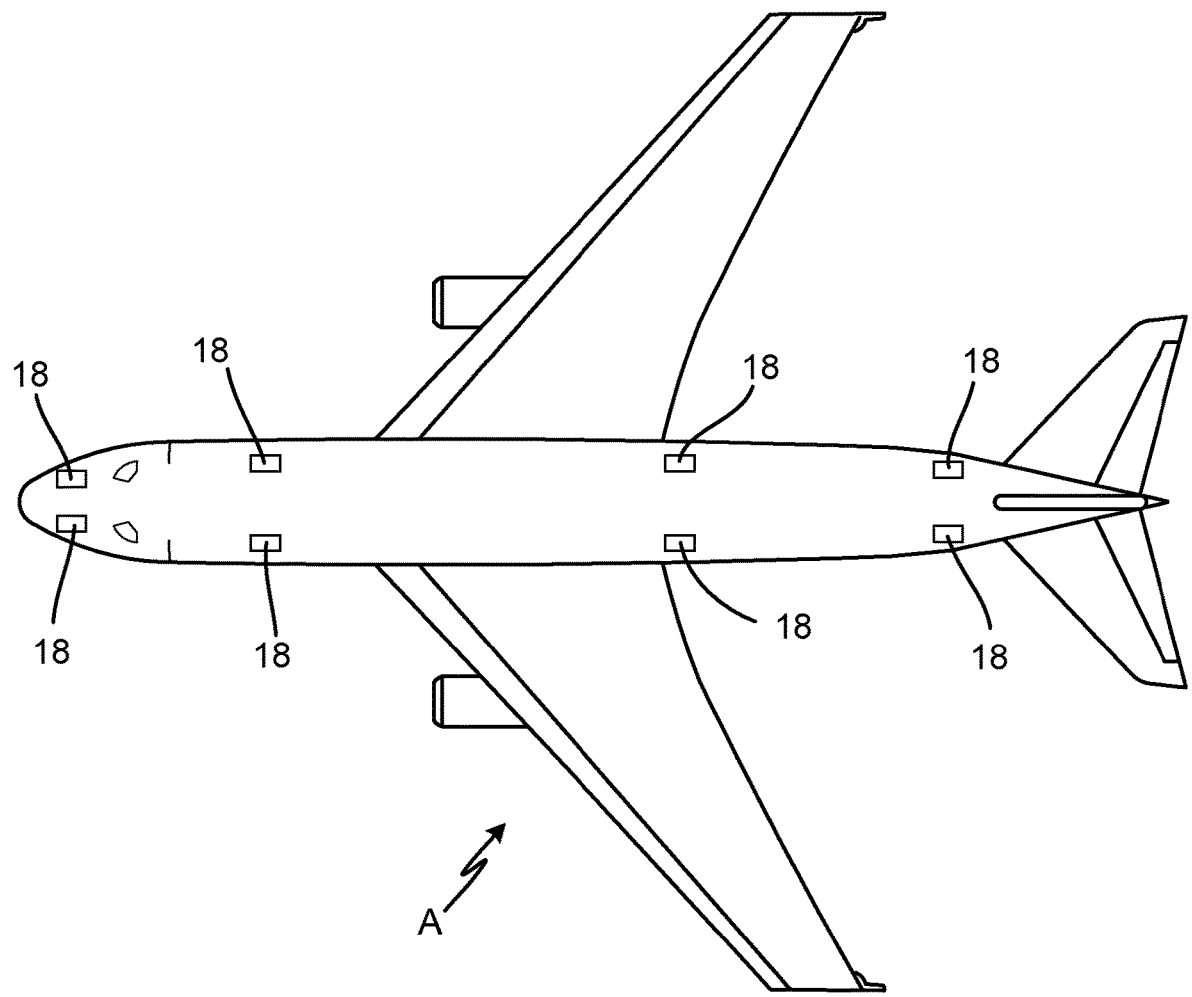
FIG. 3 is a schematic diagram illustrating example WAIC coordinators positioned on an aircraft.

FIG. 3 is a schematic diagram illustrating WAIC coordinators 18, positioned on aircraft A. In the example of FIG. 3, WAIC coordinators 18 are positioned at various locations within an interior of aircraft A, such as within the cockpit of aircraft A, within an electronics bay, a cargo area, the cabin, or other areas within the interior of aircraft A.

WAIC coordinators 18 are wireless transceivers configured to send and receive WAIC communications over the WAIC frequency range between 4.2 GHz and 4.4 GHz. WAIC coordinators 18 can, in certain examples, be considered wireless hotspots configured to transmit over the WAIC frequency range to send and receive WAIC communications with one or more devices and/or relay the WAIC communications between any one or more of WAIC coordinators 18 to provide a wireless network for WAIC communications. That is, each of WAIC coordinators 18 sends and receives WAIC communications in a physical range within which signal strength of the respective coordinator is sufficient to send and receive the WAIC communications. WAIC coordinators 18, for example, can be positioned about the interior of aircraft A so that the physical ranges of WAIC coordinators 18 overlap to provide a wireless network for WAIC communications to a portion of the interior of aircraft A or an entirety of the interior of aircraft A. Though illustrated in the example of FIG. 3 as including eight WAIC coordinators 18, it should be understood that any number of WAIC coordinators 18 can be positioned within the interior and/or exterior of aircraft A.

WAIC coordinators 18 collectively provide a wireless network for WAIC communications between electronic devices within the interior of aircraft A. Communications between electronic devices located within the interior of aircraft A over the WAIC network is accomplished via one or more of the nearest WAIC coordinators 18. Each of WAIC coordinators 18 is associated with a unique identifier, such as a serial number. In some embodiments, one or more WAIC interface devices 12 can have a fixed, wired position attached to aircraft interior cabin surface S.

Figure 4:
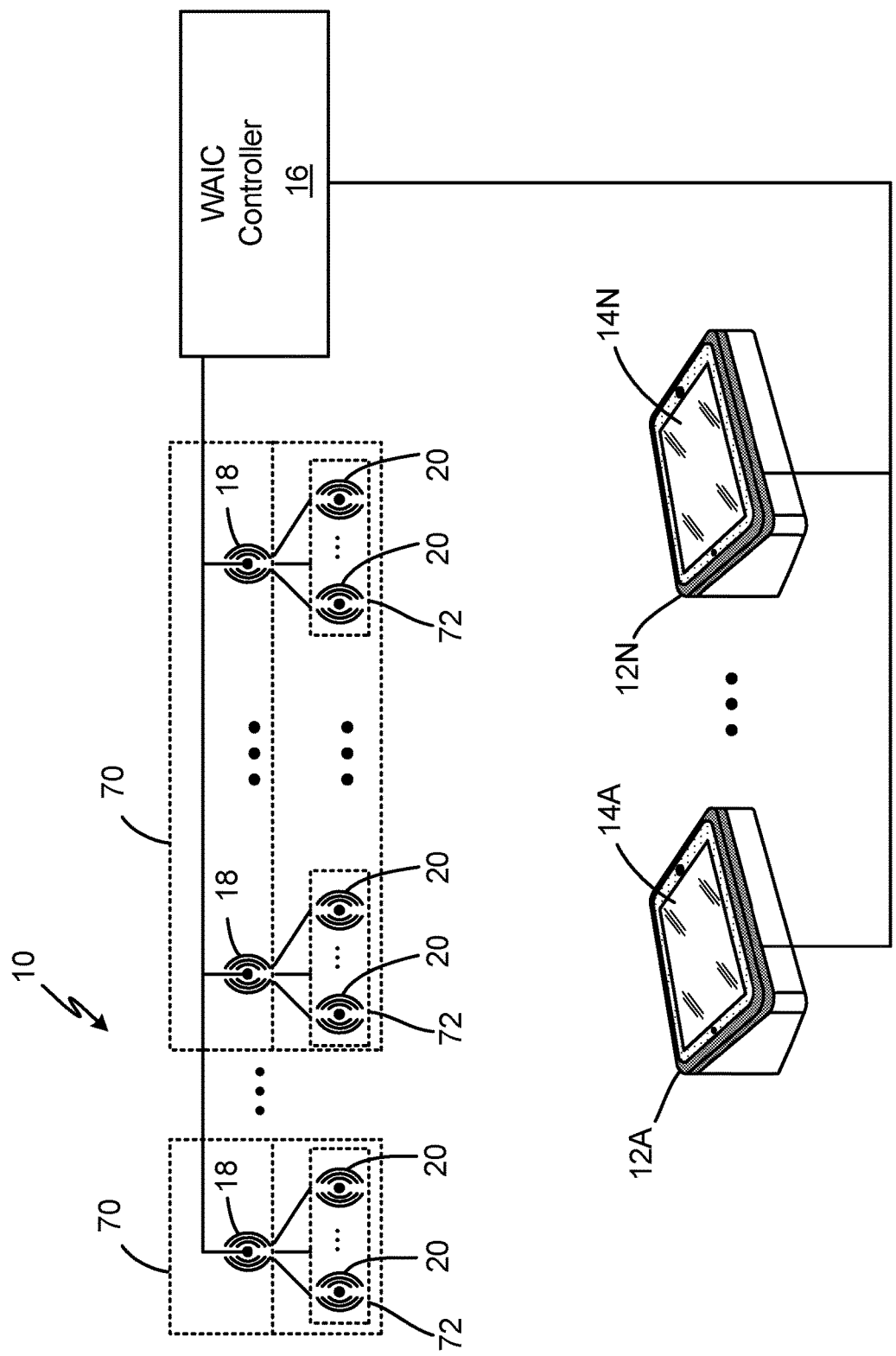
FIG. 4 is a schematic diagram illustrating details of one or more WAIC interface devices, each engaged with a portable electronic device, wired to a WAIC controller that is wired to one or more WAIC coordinators to communicate wirelessly over the WAIC frequency with one or more aircraft systems.

FIG. 4 is a schematic diagram illustrating details of WAIC interface devices (WIDE) 12A-12N (each substantially similar to WAIC interface device 12 described with respect to FIGS. 1 and 2) engaged with portable electronic devices 14A-14N (each substantially similar to portable electronic device 14 described with respect to FIG. 1) within WAIC interface system 10. As described herein, the reference "N"

denotes any arbitrary integer number greater than zero of an associated element, such as WAIC interface devices or portable electronic devices.

WAIC interface system 10 includes WAIC coordinators 18 organized into coordinator cells 70, and end nodes 20 organized into end node cells 72. End nodes 20 of each end node cell 72 connect wirelessly to an associated WAIC coordinator 18 within an associated coordinator cell 70. Coordinator cells 70 are connected to WAIC controller 16 via a wired connection, such as a serial bus or other wired connection. WAIC controller 16 is connected to each of WAIC interface devices 12A-12N via a wired connection, such as a serial bus or other wired connection. WAIC interface devices 12A-12N receive, engage, and communicate wirelessly with portable electronic devices 14A-14N.

WAIC controller 16 stores a list, table, or other association to provide zoned access between one or more WAIC interface devices 12A-12N and end nodes 20. The list or other association stored at WAIC controller 16 can specify location identifiers for WAIC interface devices 12A-12N. Each location identifier can be associated with one or more end nodes 20, end node cells 72, WAIC coordinators 18, and/or coordinator cells 70. For example, WAIC controller 16 can associate WAIC interface device 12A with a specific coordinator cell 70, which includes an associated WAIC coordinator 18 and one or more end nodes 20 that communicate with that WAIC coordinator 18. The association provides communication access between portable electronic device 14 and one or more end nodes 20 via WAIC interface device 12 and routed by WAIC controller 16 via one or more WAIC coordinators 18. In other examples, WAIC controller 16 can associate multiple WAIC interface devices 12A-12N with multiple coordinator cells 70, each of which includes one or more WAIC coordinators 18 and one or more end nodes 20. Based on the associations, WAIC controller 16 provides communication access and routes data between identified and associated portable electronic devices and their respective end node transceivers and systems/sensors via their respective WAIC interface device 12 and via the associated WAIC coordinators 18. In operation, portable electronic devices 14A-14N received and engaged by WAIC interface devices 12A-12N can be grouped in any number of ways for any number of zoned access configurations when communicating with one or more end nodes 20 via WAIC controller 16 and WAIC coordinators 18.

Figure 5:
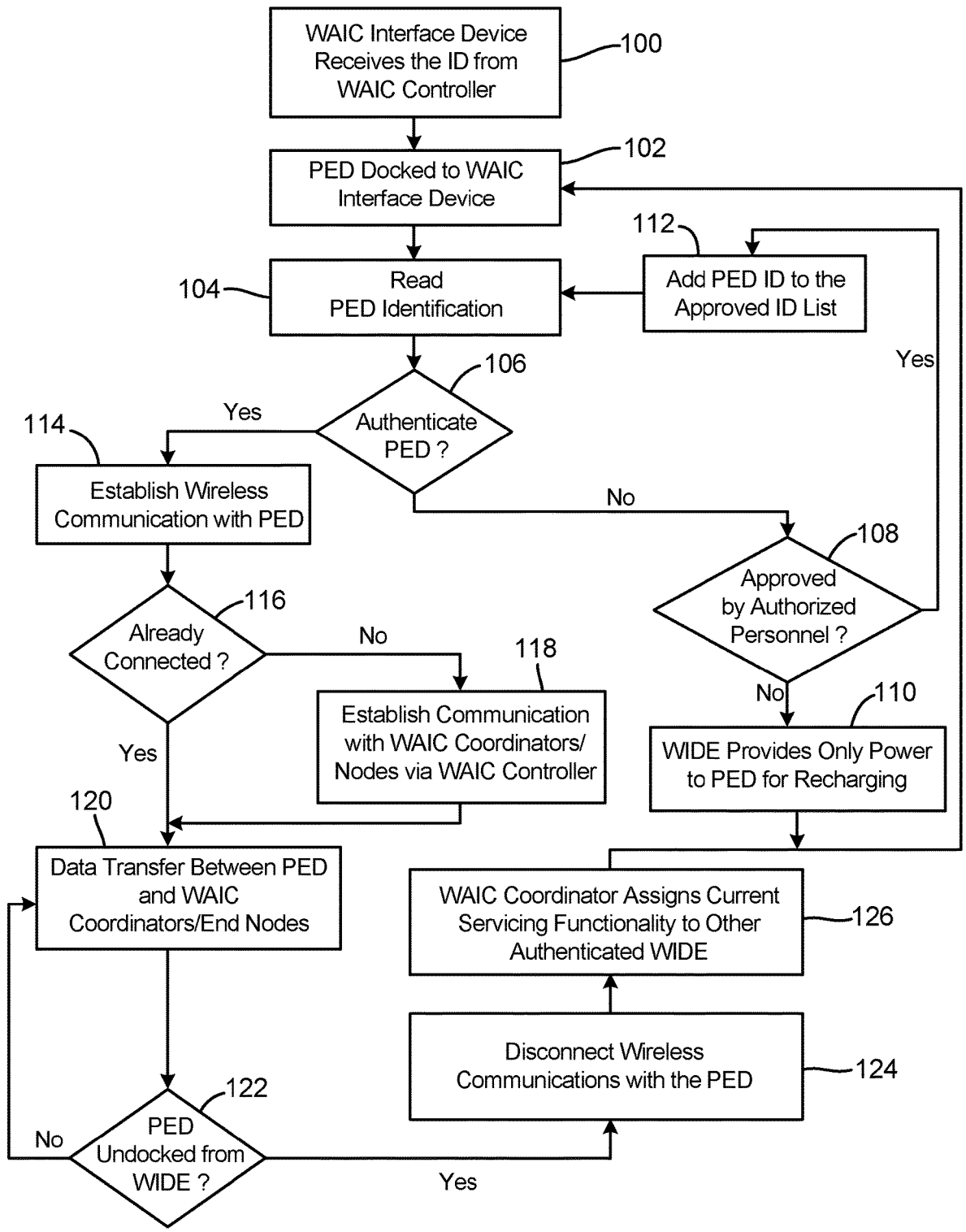
FIG. 5 is a flow diagram illustrating example operations to establish communications between a portable electronic device and aircraft systems using the WAIC interface device.

FIG. 5 is a flow diagram illustrating example operations to establish communications between a portable electronic device (PED) and one or more end node transceivers and systems/sensors using a Wireless Avionics Intra-Communications (WAIC) interface device engaged with the portable electronic device. For purposes of clarity and ease of discussion, the example operations are described below within the context of system 10 of FIG. 1.

WAIC interface device 12 (WIDE) receives a serial number or other unique identifier of the portable electronic device from WAIC controller 16. (Step 100). When portable electronic device 14 is docked at (i.e., received by and engaged with) WAIC interface device 12 (Step 102), WAIC interface device 12 reads the unique identifier of portable electronic device 14. (Step 104).

WAIC interface device 12 determines whether portable electronic device 14 is authenticated for use with WAIC interface device 12 (Step 106). For instance, authentication module 68 can compare the received unique identifier of portable electronic device 14 with the list or other association of authenticated devices to determine whether portable electronic device 14 is authenticated.

In response to determining that portable electronic device 14 is not authenticated ("NO" branch of Step 106), WAIC interface device 12 determines whether portable electronic device 14 is approved manually by authorized personnel (Step 108). In response to determining that portable electronic device 14 is approved manually by authorized personnel ("YES" branch of Step 108), the unique identifier of portable electronic device 14 is added to the list of approved identifiers (Step 112). In response to determining that portable electronic device 14 is not approved manually by authorized personnel ("NO" branch of Step 108), WAIC interface device 12 provides power to portable electronic device 14 for recharging (Step 110).

In response to determining that portable electronic device 14 is authenticated for use with WAIC interface device 12 ("YES" branch of Step 106), WAIC interface device 12 establishes wireless communications with the portable electronic device (Step 114). For example, WAIC interface device 12 can establish a wireless communications session with portable electronic device 14 via the IEEE 802.11, the IEEE 802.15.1, or other standard or proprietary wireless communications protocol supported by portable electronic device 14.

WAIC interface device 12 determines whether an active communications session exists between WAIC interface device 12 and WAIC controller 16 corresponding to portable electronic device 14 (Step 116). In response to determining that no active communications session exists between WAIC interface device 12 and WAIC controller 16 corresponding to portable electronic device 14 ("NO" branch of Step 116), WAIC interface device 12 establishes a communications session between WAIC interface device 12 and WAIC controller 16 via the wired connection (Step 118) and transfers data between portable electronic device 14 and WAIC controller 16 for communication with aircraft end node transceivers and sensors/systems (end nodes) 20 via WAIC communications via WAIC coordinators 18 (Step 120). In response to determining that an active communications session exists between WAIC interface device 12 and WAIC controller 16 corresponding to portable electronic device 14 ("YES" branch of Step 116), WAIC interface device 12 transfers data between portable electronic device 14 and WAIC controller 16 for end nodes 20 via WAIC communications via WAIC coordinators 18 (Step 120).

WAIC interface device 12 determines whether portable electronic device 14 is undocked (or otherwise physically disengaged) from WAIC interface device 12 (Step 122). In response to determining that portable electronic device 14 is not undocked from WAIC interface device 12 ("NO" branch of Step 122), WAIC interface device 12 continues to transfer data between portable electronic device 14 and WAIC controller 16 for communication with end nodes 20 via WAIC communications via WAIC coordinators 18 (Step 120). In response to determining that portable electronic device 14 is undocked from WAIC interface device 12 ("YES" branch of Step 122), WAIC interface device 12 terminates the wireless communications session between portable electronic device 14 and WAIC interface device 12 (Step 124), assigns current servicing functionality of WAIC interface device 12 to another authenticated WAIC interface device (Step 126), and continues operation when a portable electronic device is docked (or otherwise physically engaged) with WAIC interface device 12.

Accordingly, techniques of this disclosure enable commercially available off-the-shelf (COTS) portable electronic devices to communicate with aircraft sensors and/or systems via WAIC communications in the frequency range between 4.2 GHz and 4.4 GHz. Moreover, the techniques described herein adhere to the WAIC communications standard which specifies that WAIC communications are limited to only those wireless communications between aircraft systems and/or components of the same aircraft.

Discussion of Possible Embodiments

The following are non-exclusive descriptions of possible embodiments of the present invention.

A Wireless Avionics Intra-Communications (WAIC) interface device provides communication between a portable electronic device and a WAIC controller. The WAIC interface device includes a housing, a wireless antenna, wireless access point electronics, and an interface controller. The housing configured to be mounted to an interior surface of an aircraft and to receive and engage the portable electronic device. The wireless antenna is located within the housing. The wireless access point electronics is located within the housing, connected to the wireless antenna to communicate wirelessly with the portable electronic device via the wireless antenna, and connected via a communication port to a wired connection to communicate with the WAIC controller. The interface controller is located within the housing and connected to the wireless access point electronics, that authenticates the portable electronic device, so that the wireless access point electronics can establish communications between the WAIC controller and the portable electronic device via the wireless antenna, the wireless access point electronics, and the wired connection.

The WAIC interface device of the preceding paragraph can optionally include, additionally and/or alternatively, any one or more of the following features, configurations, operations, and/or additional components:

The wireless antenna and the wireless access point electronics can be configured to communicate wirelessly with the portable electronic device via one of an Institute of Electrical and Electronics Engineers (IEEE) 802.11 and an IEEE 802.15.1 wireless communications protocol.

The wireless antenna and the wireless access point electronics can be configured to communicate wirelessly with the portable electronic device via one of the IEEE 802.11 and the IEEE 802.15.1 wireless communications protocol in at least one of a 900 megahertz (MHz), 2.4 GHz, 3.6 GHz, 5 GHz, and a 60 GHz frequency band.

The housing can further include a plurality of engagement members extending from a periphery of the housing to define a retention space sized to receive the portable electronic device and engage the portable electronic device to the housing.

The housing can further include an electromagnetic shield located within the housing, wherein the wireless antenna is located within the housing at a first side of the electromagnetic shield adjacent the retention space, and wherein the wireless access point electronics is located at a second side of the electromagnetic shield opposite the first side of the electromagnetic shield.

The housing can further include near field power transfer electronics located within the housing at the first side of the electromagnetic shield. The near field power transfer electronics can be configured to wirelessly transfer electrical power with wireless power transfer electronics of the portable electronic device.

The interface controller can include a processor and computer readable memory that includes an authentication module containing instructions that, when executed by the processor, cause the WAIC interface device to authenticate the portable electronic device.

The authentication module can be configured to authenticate the portable electronic device, based on a unique identifier of the portable electronic device received from the portable electronic device via the wireless antenna and the wireless access point electronics.

A Wireless Avionics Intra-Communications (WAIC) interface system for use with a portable electronic device includes a WAIC interface device, a WAIC controller, a WAIC coordinator, and an end node. The WAIC interface device receives, engages, and communicates wirelessly with the portable electronic device. The WAIC controller is connected to the WAIC interface device via a first wired connection for communication with the portable electronic device via the WAIC interface device. The WAIC coordinator is connected to the WAIC controller via a second wired connection for communication with the WAIC controller. The WAIC coordinator is configured to communicate wirelessly over a WAIC frequency range between 4.2 gigahertz (GHz) and 4.4 GHz. The end node includes a transceiver configured to communicate wirelessly with the WAIC coordinator over the WAIC frequency range between 4.2 gigahertz (GHz) and 4.4 GHz.

The WAIC interface system of the preceding paragraph can optionally include, additionally and/or alternatively, any one or more of the following features, configurations, operations, and/or additional components:

The WAIC interface device can include a housing configured to be mounted to an interior surface of an aircraft and to receive and engage the portable electronic device. The WAIC interface device further includes a wireless antenna located within the housing. The WAIC interface device further includes wireless access point electronics located within the housing, connected to the wireless antenna to communicate wirelessly with the portable electronic device via the wireless antenna, and connected via a communication port to a wired connection to communicate with the WAIC controller. The WAIC interface device further includes an interface controller, located within the housing and connected to the wireless access point electronics that authenticates the portable electronic device, so that the wireless access point electronics can establish communications between the WAIC controller and the portable electronic device via the wireless antenna, the wireless access point electronics, and the wired connection.

The interface controller can include a processor and computer readable memory that includes an authentication module containing instructions that, when executed by the processor, cause the WAIC interface device to authenticate the portable electronic device.

The authentication module can be configured to authenticate the portable electronic device, based on a unique identifier of the portable electronic device received from the portable electronic device via the wireless antenna and the wireless access point electronics.

The housing can further include a plurality of engagement members extending from a periphery of the housing to define a retention space sized to receive the portable electronic device and engage the portable electronic device to the housing.

The housing can further include an electromagnetic shield located within the housing. The wireless antenna can be located within the housing at a first side of the electromagnetic shield adjacent the retention space. The wireless access point electronics can be located at a second side of the electromagnetic shield opposite the first side of the electromagnetic shield.

The WAIC interface device can further include near field power transfer electronics located within the housing at the first side of the electromagnetic shield. The near field power transfer electronics can be configured to wirelessly transfer electrical power with wireless power transfer electronics of the portable electronic device.

The wireless antenna and the wireless access point electronics can communicate wirelessly with the portable electronic device via one of an Institute of Electrical and Electronics Engineers (IEEE) 802.11 and an IEEE 802.15.1 wireless communications protocol in at least one of a 900 megahertz (MHz), 2.4 GHz, 3.6 GHz, 5 GHz, and a 60 GHz frequency band.

The WAIC interface device can use a WAIC interface device location ID to authorize zoned access to the WAIC interface device, and restrict the portable electronic device to retrieve data from authorized WAIC coordinators and end nodes.

A method includes establishing, using a wireless antenna and wireless access point electronics of a WAIC interface device, a first wireless communications session with a portable electronic device for wireless communications between the WAIC interface device and the portable electronic device. The method further includes communicating, using a first wired connection from the WAIC interface device, between the WAIC interface device and a WAIC controller. The method further includes communicating, using a second wired connection from the WAIC controller, between the WAIC controller and a WAIC coordinator The method further includes establishing a second wireless communications session from the WAIC coordinator, for wireless communications between the WAIC coordinator and an end node transceiver and system/sensor using WAIC standard in frequency range between 4.2 gigahertz (GHz) and 4.4 GHz. The method further includes disconnecting, upon disengagement of the portable electronic device from the WAIC interface device, the WAIC interface device and disengaged portable electronic device from communicating with the WAIC coordinator.

The method of the preceding paragraph can optionally include, additionally and/or alternatively, any one or more of the following features, configurations, operations, and/or additional components:

Establishing the first wireless communications session with the portable electronic device can include establishing a wireless communications session with the portable electronic device for wireless communications between the WAIC interface device and the portable electronic device via one of an Institute of Electrical and Electronics Engineers (IEEE) 802.11 and an IEEE 802.15.1 wireless communications protocol in at least one of a 900 megahertz (MHz), a 2.4 GHz, a 3.6 GHz, a 5 GHz, and a 60 GHz frequency band.

Receiving, by the WAIC interface device, authentication data from the portable electronic device via the first wireless communications session with the portable electronic device, the authentication data including a unique identifier of the portable electronic device, and determining, based on the unique identifier of the portable electronic device, whether the portable electronic device is authenticated for use with the WAIC interface device and therefore of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A Wireless Avionics Intra-Communications (WAIC) interface device that provides communication between a portable electronic device and a WAIC controller, the WAIC interface device comprising:
a housing configured to be mounted to an interior surface of an aircraft and to receive and engage the portable electronic device;
a wireless antenna located within the housing;
wireless access point electronics located within the housing, connected to the wireless antenna to communicate wirelessly with the portable electronic device via the wireless antenna, and connected via a communication port to a wired connection to communicate with the WAIC controller; and
an interface controller, located within the housing and connected to the wireless access point electronics, that authenticates the portable electronic device, so that the wireless access point electronics can establish communications between the WAIC controller and the portable electronic device via the wireless antenna, the wireless access point electronics, and the wired connection.

2. The WAIC interface device of claim 1,
wherein the wireless antenna and the wireless access point electronics communicate wirelessly with the portable electronic device via one of an Institute of Electrical and Electronics Engineers (IEEE) 802.11 and an IEEE 802.15.1 wireless communications protocol.

3. The WAIC interface device of claim 2,
wherein the wireless antenna and the wireless access point electronics communicate wirelessly with the portable electronic device via one of the IEEE 802.11 and the IEEE 802.15.1 wireless communications protocol in at least one of a 900 megahertz (MHz), 2.4 GHz, 3.6 GHz, 5 GHz, and a 60 GHz frequency band.

4. The WAIC interface device of claim 3, wherein:
the housing comprises a plurality of engagement members extending from a periphery of the housing to define a retention space sized to receive the portable electronic device and engage the portable electronic device to the housing.

5. The WAIC interface device of claim 4,
wherein the housing further comprises an electromagnetic shield located within the housing;
wherein the wireless antenna is located within the housing at a first side of the electromagnetic shield adjacent the retention space; and
wherein the wireless access point electronics is located at a second side of the electromagnetic shield opposite the first side of the electromagnetic shield.

6. The WAIC interface device of claim 5, further comprising:
near field power transfer electronics located within the housing at the first side of the electromagnetic shield, the near field power transfer electronics configured to wirelessly transfer electrical power with wireless power transfer electronics of the portable electronic device.

7. The WAIC interface device of claim 1,
wherein the interface controller comprises a processor and computer readable memory that includes an authentication module containing instructions that, when executed by the processor, cause the WAIC interface device to authenticate the portable electronic device.

8. The WAIC interface device of claim 7,
wherein the authentication module is configured to authenticate the portable electronic device, based on a unique identifier of the portable electronic device received from the portable electronic device via the wireless antenna and the wireless access point electronics.

9. A Wireless Avionics Intra-Communications (WAIC) interface system for use with a portable electronic device, the system comprising:
a WAIC interface device that receives, engages, and communicates wirelessly with the portable electronic device, wherein the WAIC interface device comprises:
a housing configured to be mounted to an interior surface of an aircraft and to receive and engage the portable electronic device;
a wireless antenna located within the housing;
wireless access point electronics located within the housing, connected to the wireless antenna to communicate wirelessly with the portable electronic device via the wireless antenna, and connected via a communication port to a wired connection to communicate with a WAIC controller; and
an interface controller, located within the housing and connected to the wireless access point electronics, that authenticates the portable electronic device, so that the wireless access point electronics can establish communications between the WAIC controller and the portable electronic device via the wireless antenna, the wireless access point electronics, and the wired connection, wherein the WAIC controller is connected to the WAIC interface device via a first wired connection for communication with the portable electronic device via the WAIC interface device;
a WAIC coordinator connected to the WAIC controller via a second wired connection for communication with the WAIC controller, the WAIC coordinator configured to communicate wirelessly over a WAIC frequency range between 4.2 gigahertz (GHz) and 4.4 GHz; and
an end node that includes a transceiver configured to communicate wirelessly with the WAIC coordinator over the WAIC frequency range between 4.2 gigahertz (GHz) and 4.4 GHz.

10. The system of claim 9,
wherein interface controller comprises a processor and computer readable memory that includes an authentication module containing instructions that, when executed by the processor, cause the WAIC interface device to authenticate the portable electronic device.

11. The system of claim 10,
wherein the authentication module is configured to authenticate the portable electronic device, based on a unique identifier of the portable electronic device received from the portable electronic device via the wireless antenna and the wireless access point electronics.

12. The system of claim 9,
wherein the housing comprises a plurality of engagement members extending from a periphery of the housing to define a retention space sized to receive the portable electronic device and engage the portable electronic device to the housing.

13. The system of claim 12,
wherein the housing further comprises an electromagnetic shield located within the housing;
wherein the wireless antenna is located within the housing at a first side of the electromagnetic shield adjacent the retention space; and
wherein the wireless access point electronics is located at a second side of the electromagnetic shield opposite the first side of the electromagnetic shield.

14. The system of claim 13, wherein the WAIC interface device further comprises:
near field power transfer electronics located within the housing at the first side of the electromagnetic shield, the near field power transfer electronics configured to wirelessly transfer electrical power with wireless power transfer electronics of the portable electronic device.

15. The system of claim 9,
wherein the wireless antenna and the wireless access point electronics communicate wirelessly with the portable electronic device via one of an Institute of Electrical and Electronics Engineers (IEEE) 802.11 and an IEEE 802.15.1 wireless communications protocol in at least one of a 900 megahertz (MHz), 2.4 GHz, 3.6 GHz, 5 GHz, and a 60 GHz frequency band.

16. The system of claim 9, wherein the WAIC controller:
uses a WAIC interface device location ID to authorize zoned access to the WAIC interface device; and
restricts the portable electronic device to retrieve data from authorized WAIC coordinators and end nodes.

17. A method comprising:
establishing, using a wireless antenna, and wireless access point electronics of a WAIC interface device, a first wireless communications session with a portable electronic device for wireless communications between the WAIC interface device and the portable electronic device, wherein the wireless antenna is within a housing, and wherein the housing is configured to be mounted to an interior surface of an aircraft and to receive and engage the portable electronic device;
communicating, using a first wired connection from the WAIC interface device, between the WAIC interface device and a WAIC controller;
communicating, using a second wired connection from the WAIC controller, between the WAIC controller and a WAIC coordinator;
establishing a second wireless communications session from the WAIC coordinator, for wireless communications between the WAIC coordinator and an end node transceiver and system/sensor using WAIC standard in frequency range between 4.2 gigahertz (GHz) and 4.4 GHz; and
disconnecting, upon disengagement of the portable electronic device from the WAIC interface device, the WAIC interface device and disengaged portable electronic device from communicating with the WAIC coordinator.

18. The method of claim 17,
wherein establishing the first wireless communications session with the portable electronic device comprises establishing a wireless communications session with the portable electronic device for wireless communications between the WAIC interface device and the portable electronic device via one of an Institute of Electrical and Electronics Engineers (IEEE) 802.11 and an IEEE 802.15.1 wireless communications protocol in at least one of a 900 megahertz (MHz), a 2.4 GHz, a 3.6 GHz, a 5 GHz, and a 60 GHz frequency band.

19. The method of claim 18, further comprising:

receiving, by the WAIC interface device, authentication data from the portable electronic device via the first wireless communications session with the portable electronic device, the authentication data including a unique identifier of the portable electronic device; and determining, based on the unique identifier of the portable electronic device, whether the portable electronic device is authenticated for use with the WAIC interface device and therefore the aircraft.

* * * * *